H. H. MARTIN.
COST FILING DEVICE.
APPLICATION FILED JAN. 17, 1917.

1,253,410.

Patented Jan. 15, 1918.

INVENTOR.
Harold H. Martin.
BY
Pierre Barnes
ATTORNEY.

UNITED STATES PATENT OFFICE.

HAROLD H. MARTIN, OF SEATTLE, WASHINGTON.

COST-FILING DEVICE.

1,253,410.  Specification of Letters Patent.  Patented Jan. 15, 1918.

Application filed January 17, 1917. Serial No. 142,949.

*To all whom it may concern:*

Be it known that I, HAROLD H. MARTIN, a citizen of the United States, residing at Seattle, in the county of King and State of Washington, have invented certain new and useful Improvements in Cost-Filing Devices, of which the following is a specification.

The object of this invention is to provide a novel system or means whereby the estimating of freight rates or the like is facilitated, and afford in convenient form other information pertaining to transportation matters.

The invention consists in the novel arrangement, adaptation and combination of series of cards, or their equivalent, which are devoted to data relating to inbound and outbound shipping rates.

The invention is illustrated in the accompanying drawings in which—

Figure 1 represents a face view of two superposed cards embodying certain features of the invention; Fig. 2 is a face view of the underneath card shown in Fig. 1; Fig. 3 is a view similar to Fig. 1 of two superposed cards to illustrate other features of the invention; Fig. 4 is a face view of the underneath card of Fig. 3; and Fig. 5 is a fragmentary rear view of one of the cards.

In carrying out my invention, I provide two sets of cards, respectively relating to inbound and outbound shipments which, in turn, are each formed of two subdivisions.

The outbound set comprises a number of cards upon which are marked destination points such, for example, as "Bellingham," as indicated by numeral 10 upon the card denoted by M in Fig. 2, preferably at the upper left-hand side of the card. To the right thereof and disposed in columns 11, 12 and 13 are series of predetermined numbers arranged in horizontal rows, as designated by A, B, C, etc., marked in the column 14.

The numbers 15 given in the column 11 are the freight rates per hundred pounds from the point of shipment, as Seattle, for example, to the destination, and derived from the so-called tariff sheets, as indicated by 16 in the example.

Subjacent to this notation is given the shipping route as "Great Northern Ry", indicated by 17, and in close association therewith the transfer or terminal route, indicated by 18, by which shipments may preferably be delivered. In column 12 is designated by numbers 19 the relative amount of goods which may be sent express from the shipping point to the destination to which a particular card relates at the same cost as one hundred pounds by freight. Also in column 13 are numbers 20 which represent the number of pounds which may be sent by parcel post at the same cost as one hundred pounds of freight.

Coöperating with the above-described, or other similarly arranged destination and rate-card, are what I term commodity cards, a selected one denoted by K being illustrated in Fig. 1, giving thereon the name, as "candy," 21 of the commodity appropriated to the card, together with other information necessary for the shipper to know to obtain the best rate on the referred to commodity, as the manner of packing, indicated by 22. The card at its right-hand side is notched or slotted to afford a horizontally disposed aperture 23, through which can be seen the freight rate and the equivalent amounts in weight for express and parcel post shipments upon the destination card (Fig. 2), when the latter is placed therebelow, as indicated in Fig. 1.

The numbers in row B of Fig. 2, which give freight rates, etc., on the class of goods to which the selected commodity card pertains, is discerned through the aperture 23 when the cards are placed one on the other, as shown in Fig. 1. For convenience, the card K is marked in spaced relations to correspond with columns 11, 12 and 13, index characters $11^2$, $12^2$ and $13^2$ representing weights (cwt. and lbs.) and characters $11^3$, $12^3$ and $13^3$ ("Freight," "Express" and "P. Post") representing mode of conveyance.

The manner of using the invention so far described may be explained as follows:

The shipper or consignor places the proper commodity card K, as for candy, over a destination card M, as in Fig. 1, and through the aperture 23 of the upper card is disclosed all of the numbers provided in the row B of the destination card M. These numbers will show with reference to the index characters provided on the upper, or commodity, card K that the rate by freight will be twenty-five cents per hundred pounds and that quantities of candy not exceeding thirteen pounds may be sent by express or twenty-one pounds by parcel post at a cost of twenty-five cents or less.

By such devices it is apparent that the shipper may not only readily determine the freight rate, but can tell at a glance whether it is the most economical way of forwarding the goods.

The invention also includes devices arranged to facilitate estimating cost of inbound freight, etc., wherein cards are utilized somewhat similar to that employed for obtaining outbound rates, but in reversed order.

Referring now to Figs. 3 and 4, $M^1$ represents an inbound shipping point card and $K^1$ a commodity card for use therewith, the particular cards being used merely as samples. With inbound traffic, the commodity card $K^1$ has marked thereon, as at $21^1$, the name or class of article, as "Acid", and in association therewith information, as at $22^1$, regarding packing, etc. In these respects it is, or may be, similar to the markings on the aforedescribed outbound commodity cards. With inbound rate cards, however, tariff rates are marked on the commodity cards, as indicated by numerals $15^1, 15^2, 15^3$, etc. in column $11^4$, and $19^1, 19^2, 19^3$, etc. in column $12^4$ of the sample card, and consecutively in rows A, B, C, etc. of the referred to card according to the rate as determined by the railway tariff for different zones in relation to the destination, as Seattle, for example.

Referring to Fig. 3, a shipping-point card $M^1$ is provided, besides its designating name $10^1$, with notations, as the tariff source, indicated by $16^1$ and route indicated by $17^1$. A shipping-point card is, moreover, provided with an aperture $23^1$ in a row, as D, which will coincide to the position of the freight rates, as "3.40" and "2.45", corresponding to tariff rates from the point of shipment, Chicago, Ill. in the example, to the destination. The aperture $23^1$ also discloses the express rate, as "52" in the example, and designates the maximum number of pounds of goods which may be sent by express at a cost equal to that charged for one hundred pounds by freight.

On a shipping-point card is shown in columns $11^5$, $12^5$ and $13^5$, respectively, abbreviations LCL (less than carload lots), CL (carload) and Lbs. (pounds), the latter being qualified by the word "express" placed in proximity thereto. To employ the inbound cards, the proper commodity one, as in Fig. 4, is placed below the shipping point one, as represented in Fig. 3.

The rates given on a commodity card, Fig. 4, pertaining to inbound traffic, are arranged in rows A, B, C, etc., according to the zone distance from the destination, the row A, for example, specifying rates from Atlantic seaboard places, B from points farther west, and so on, the apertures in the shipping point cards being disposed to register with the proper row in the commodity cards.

The commodity cards for the outbound set and the shipping-point cards of the inbound set are each reinforced by a sheet 30 of celluloid or other transparent material attached to the back of the respective card, as indicated in Fig. 5.

The invention will, it is thought, be understood from the foregoing description. Its advantages reside principally in the provision of means which enable a shipper or consignee to determine or check freight rates without the necessity of keeping up and consulting a cumbersome and complicated set of tariffs which require the service of a specialist. A further advantage resides in the association with the tabulated freight rates, of data exhibiting the relative costs to ship articles by express or parcel post.

What I claim, is—

1. In devices of the class described, the combination with a series of cards having thereon the names of destinations and classified freight rates, of a series of cards having marked thereon the names of commodities, said last named cards being each provided with an opening which is arranged to disclose therethrough the freight rate for the particular class of goods designated upon a selected one of the first named cards when one of the second named cards is placed over the latter.

2. In devices of the class described, sets of cards devoted to outgoing freight, comprising a plurality of cards with destination points and tariffs marked thereon, and a plurality of cards with the names of commodities marked thereon in combination with sets of cards devoted to incoming freight comprising a plurality of cards with the names of commodities and tariffs marked thereon, and a plurality of cards having destination points marked thereon, the cards provided with commodity names of the outgoing freight and the cards provided with destination points of the incoming freight being each provided with an opening through which may be disclosed the respective tariff rates of the supplementary cards of the respective outgoing and incoming cards.

3. In devices of the class described, the combination with a card having marked thereon the name of a commodity, a column of numbers giving freight rates on such commodity, and a column of numbers giving the weights of such commodity which may be sent by express at the aforesaid freight rates, of a card devoted to a predetermined destination and having an opening therein through which the freight rate on the commodity and relative amount of such commodity which may be sent by express may be observed on the first named card when placed below the second named card.

4. In a device of the class described, the combination of a freight tariff sheet with series of numbers devoted to express and parcel post shipments, said numbers designating the weights of goods which may be sent by the respective shipments at the same rates as one hundred pounds of freight, of a sheet provided with an opening through which selected of said numbers may be observed coincidently with a rate from the freight tariff.

Signed at Seattle, Washington, this 12th day of January, 1917.

HAROLD H. MARTIN.

Witnesses:
PIERRE BARNES,
E. PETERSON.

Copies of this patent may be obtained for five cents each, by addressing the "Commissioner of Patents, Washington, D. C."